United States Patent

Schultz et al.

[15] 3,660,591
[45] May 2, 1972

[54] HOSPITAL IN-PATIENT SERVICE CORE MODULE

[72] Inventors: John R. Schultz; John W. Heidacher; John M. Sharer; James S. Adams, all of Batesville, Ind.; Frank M. Damico, Cincinnati, Ohio

[73] Assignee: Hill Rom Company, Inc., Batesville, Ind.

[22] Filed: Oct. 26, 1970

[21] Appl. No.: 83,762

[52] U.S. Cl. .................................174/70 R, 5/2, 5/53, 52/28, 52/36, 52/173, 128/1, 174/49
[51] Int. Cl. ...............................A47b 83/00, A61g 7/06
[58] Field of Search .................................52/27, 28, 34–36, 52/173, 486; 174/48, 49, 70 R; 312/209; 5/2 R, 53 R; 128/1, 172

[56] References Cited

UNITED STATES PATENTS

| 3,032,057 | 5/1962 | Mays | 128/172 X |
| 3,250,583 | 5/1966 | Phillips | 312/209 |
| 3,267,332 | 8/1966 | Bobrick | 174/48 |
| 3,461,349 | 8/1969 | Meyer | 174/48 |
| 3,462,892 | 8/1969 | Meyer | 174/49 |
| 3,514,794 | 6/1970 | Pofferi | 5/2 R |

Primary Examiner—Henry C. Sutherland
Attorney—George H. Simmons and Robert V. Jambor

[57] ABSTRACT

A factory constructed, equipped with electrical and gas equipment, wired, tested and enclosed patient care core module arranged to be mounted upon the headwall of a patient's room in a hospital. The mounting of the module is simply accomplished and after the module is secured on the wall, the electric and gas supply leads are connected externally of the enclosure to complete the installation.

21 Claims, 19 Drawing Figures

Patented May 2, 1972

Inventors:
John R. Schultz,
John W. Heidacher,
John M. Sharer,
James S. Adams and
Frank M. Damico
By George H. Simmons
Att'y

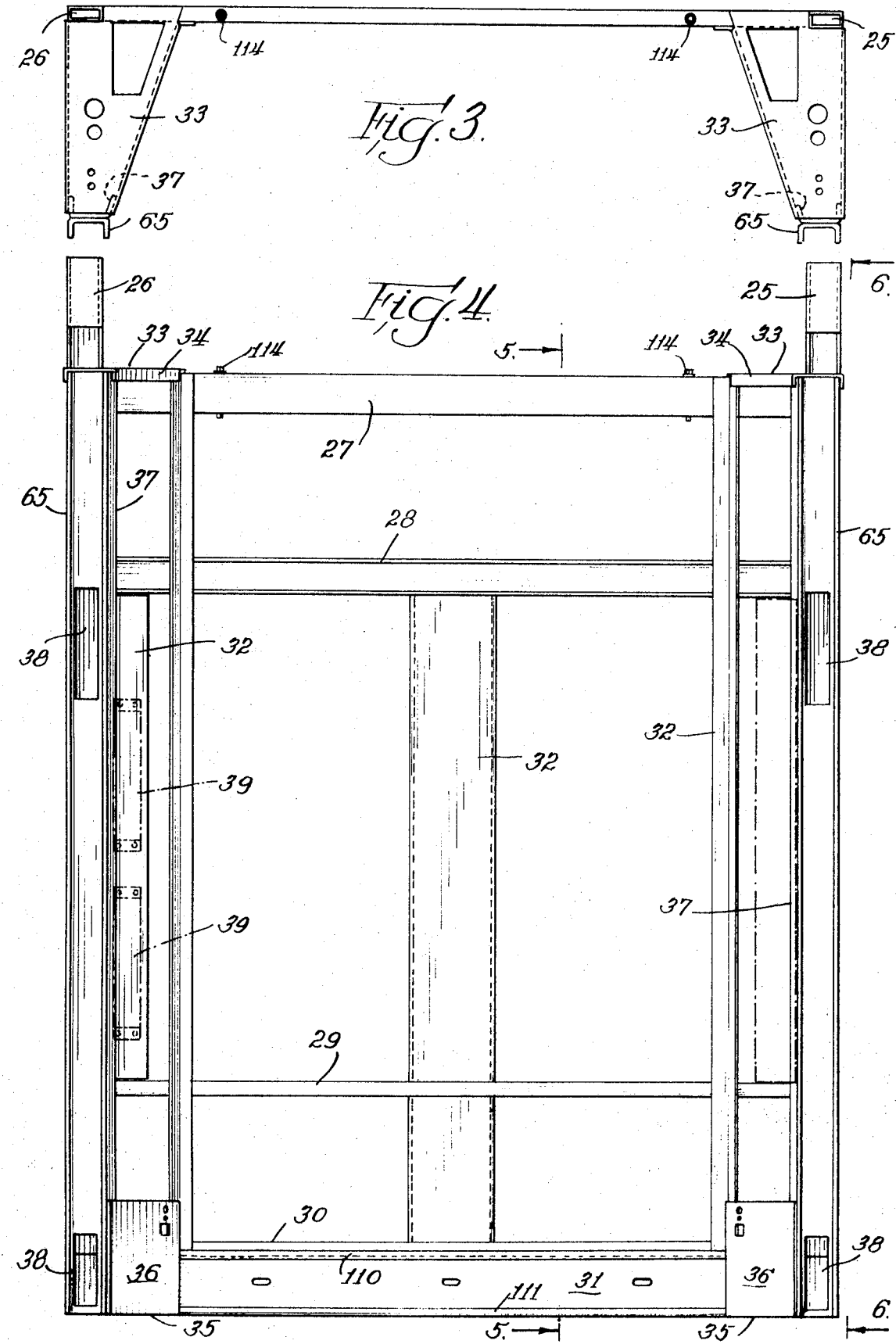

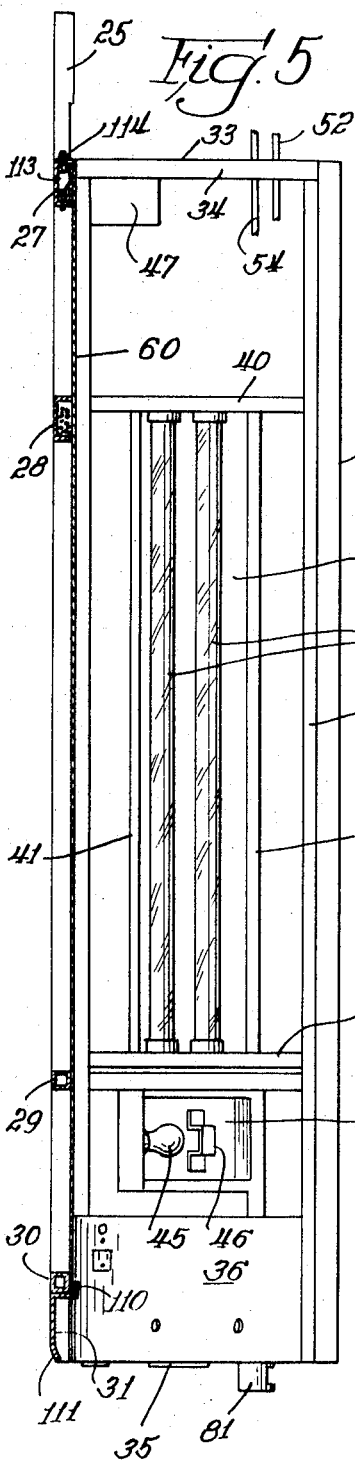
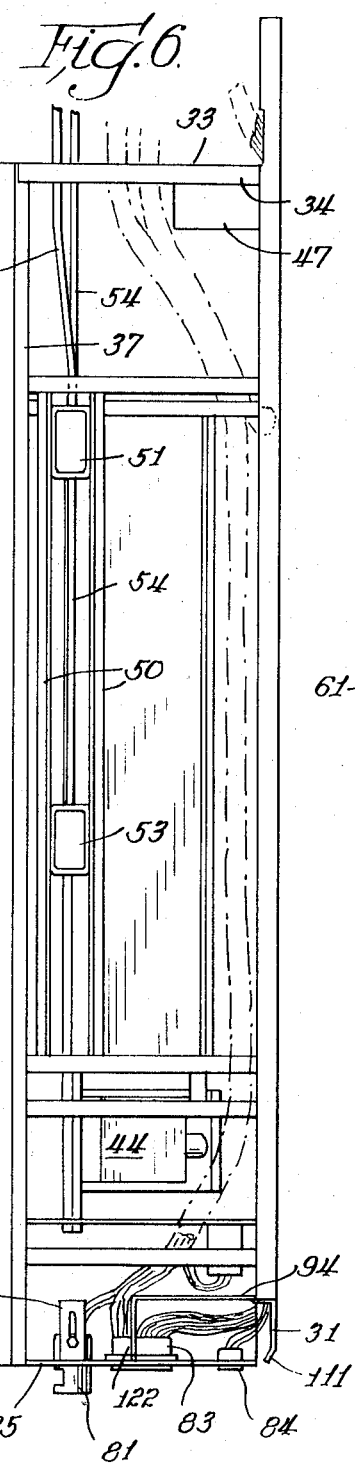
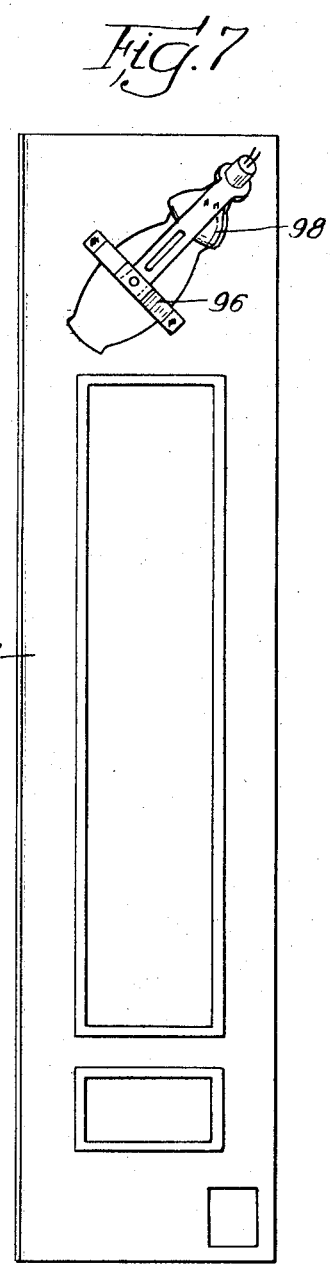

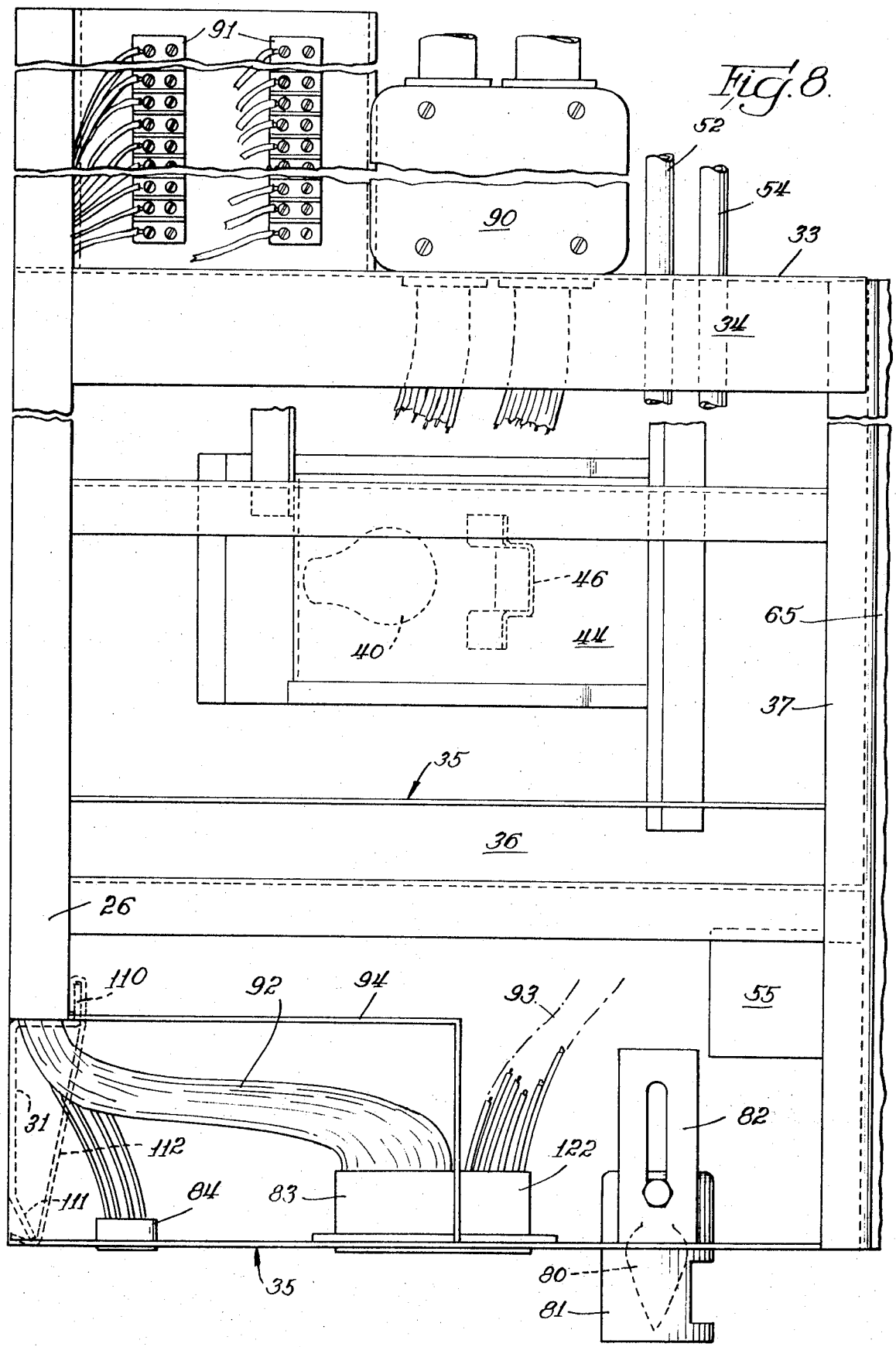

Patented May 2, 1972  3,660,591

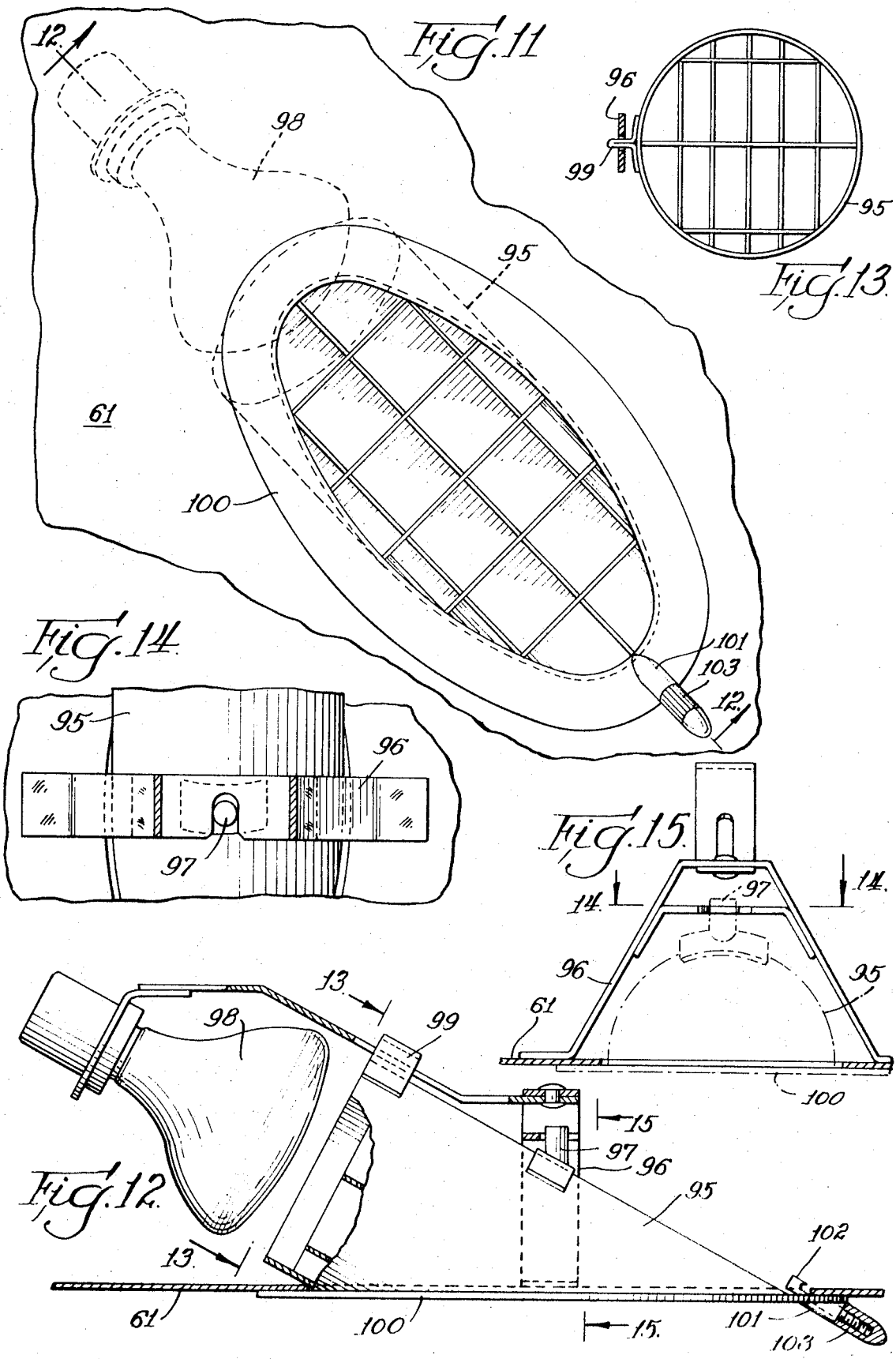

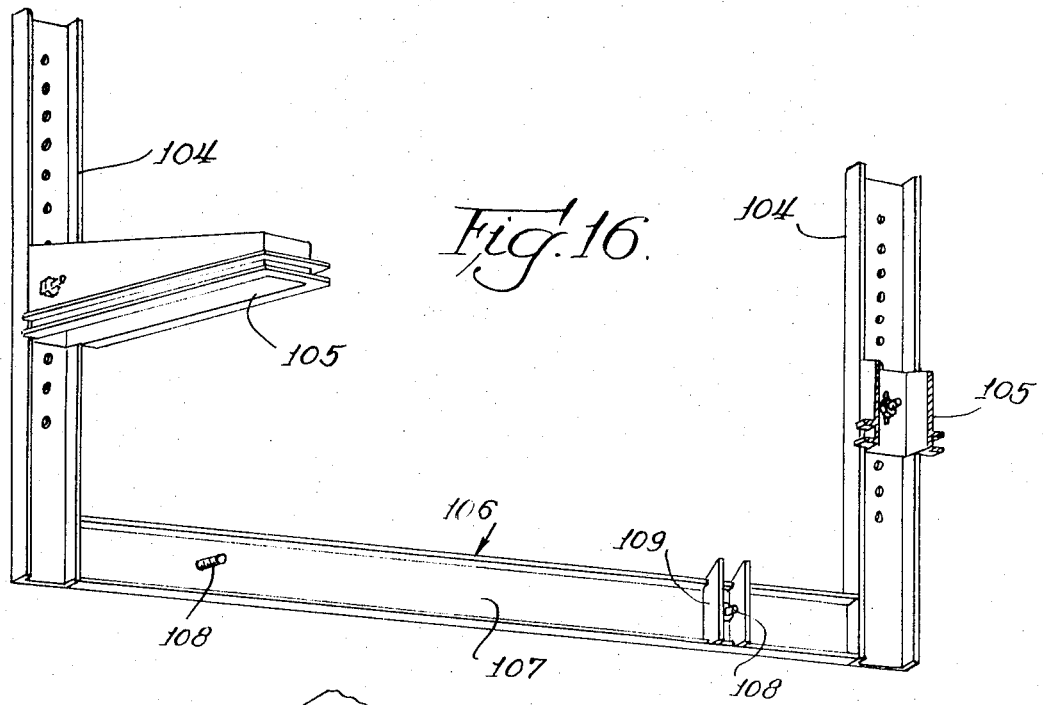
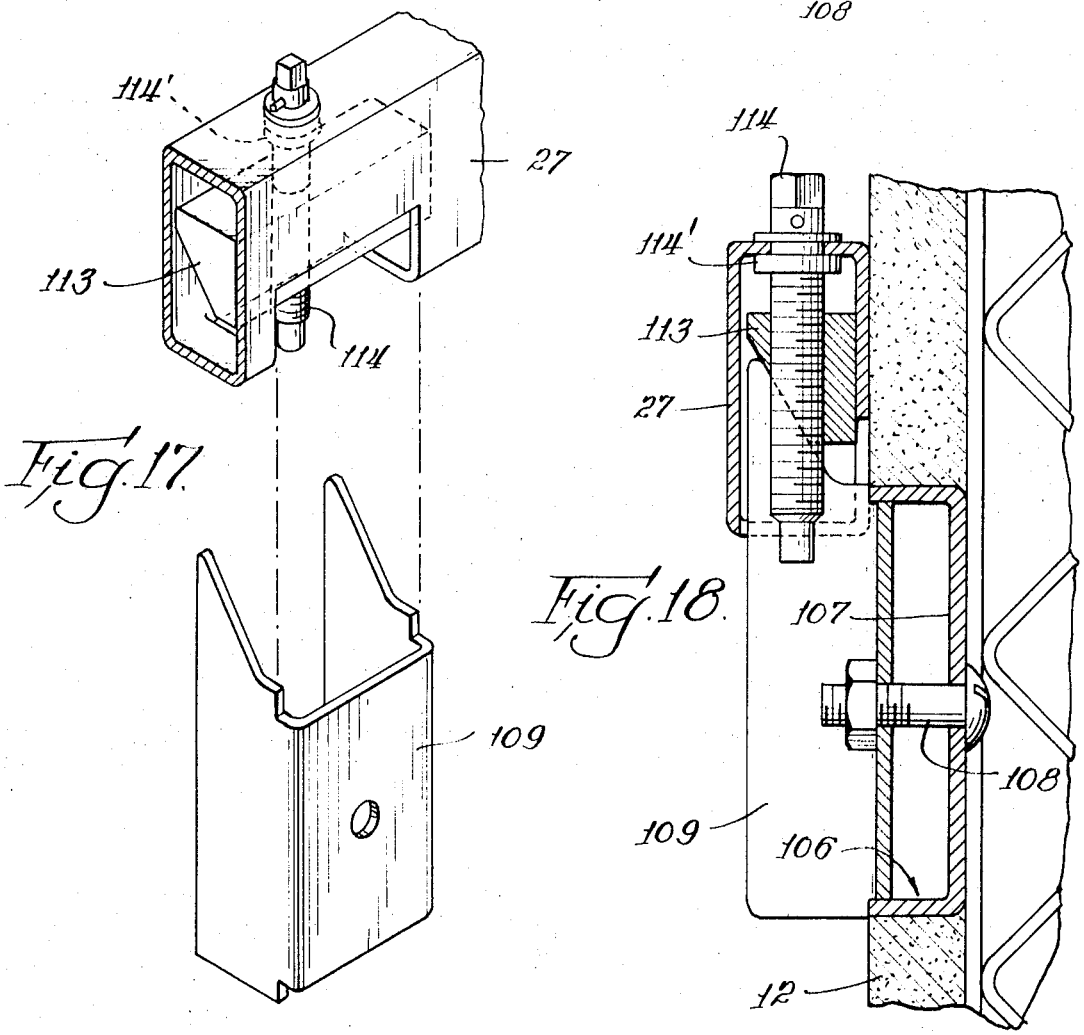

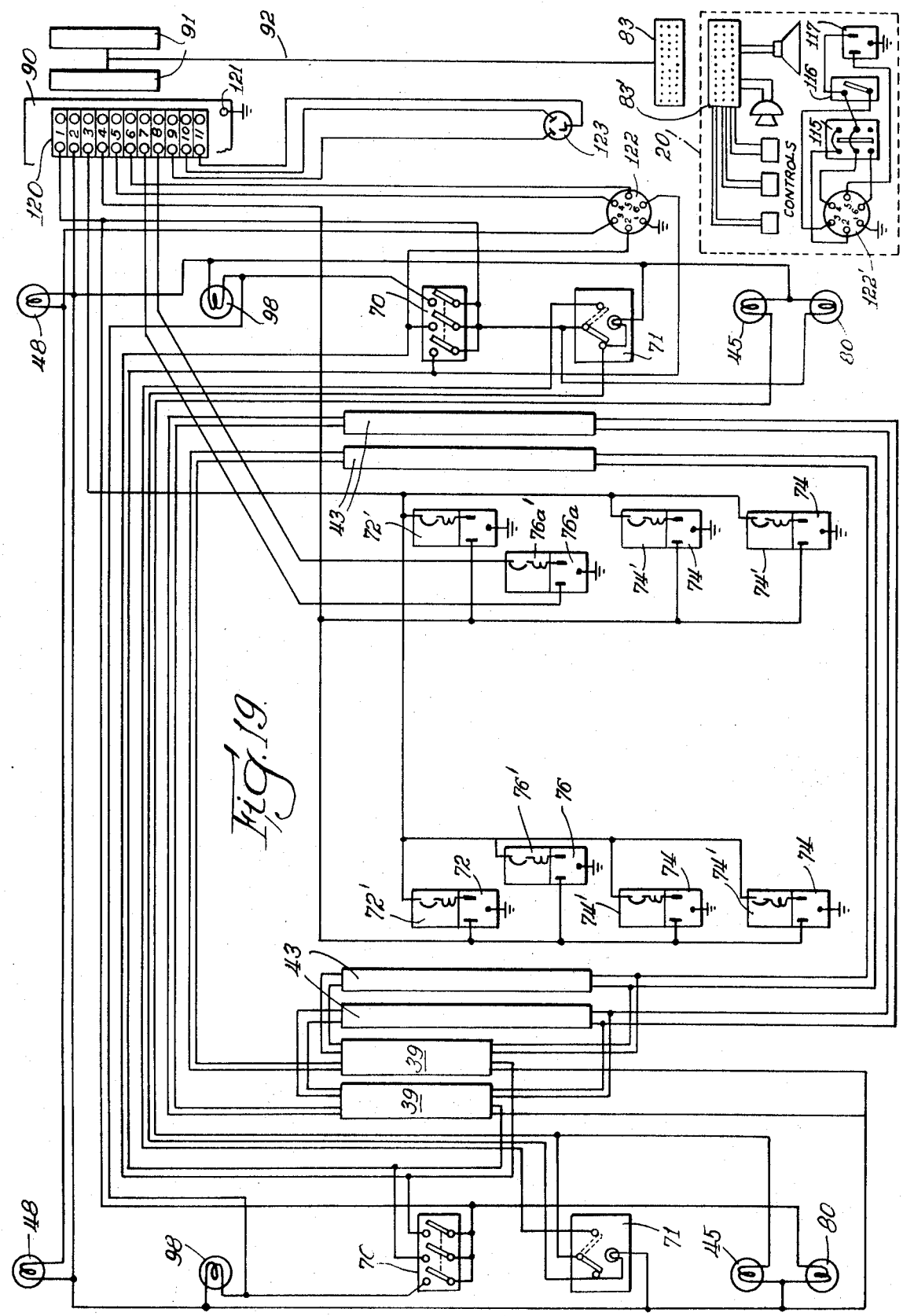

HOSPITAL IN-PATIENT SERVICE CORE MODULE

BACKGROUND OF THE INVENTION

In the construction of the patient's room in a hospital, the headwall is a most expensive item. This is because this wall, against which the head of the patient's bed is located, must contain the facilities required for the care and treatment of a patient. These facilities include electrical outlets, gas source supplies and communication facilities, all of which are installed within the wall during the construction thereof. This type of headwall construction is at a disadvantage in that the electrical outlets, which are several in number, are in part at least disposed at some distance from the hospital bed with the result that long cords are required to connect electricity to the bed and to equipment used in the treatment and care of a patient. The arrangement is at a further disadvantage in that equipment used in the care of a patient which requires a ground connection, such as is required by an electrocardiograph, it is often difficult to find a proper ground for the device. The present invention seeks to overcome these difficulties and disadvantages and to reduce the cost of construction of a patient's quarters in a hospital.

SUMMARY OF THE INVENTION

The present invention comprises a factory made self-contained core module having a framework that supports the various light fixtures, gas valves, electrical switches, circuit breakers and the like. The framework consists of the wall section generally rectangular in shape and equipped for mounting upon the headwall of a patient's room in a convenient manner. The framework also consists of side sections which are generally wedge shaped and project from the opposite vertical edges of the wall section. The framework is covered by a suitable back wall panel and inside and outside panels on the faces of the side sections of the framework.

When mounted upon the headwall of the hospital patient's room, the module is disposed above the floor of the room a sufficient distance to permit normal use of the floor care machinery employed in care of the floor. The module does not extend completely to the ceiling of the room, but rather, terminates below that ceiling. Extensions of the side sections conveniently referred to as service covers, extend from the upper surface of the core module through the ceiling of the room.

In modern hospital construction, the ceilings in patient's rooms are disposed an appreciable distance below the floor of the room above. In this space, the electrical conduits, the gas and vacuum lines and communication cables are located as are heating and venting ducts as may be required. After the module has been secured upon the headwall, the electrical wires, communication cable and gas conduits are connected to the module after which the service covers are installed to complete the installation of the module.

Located at the bottom of the module are guides adapted to be engaged by the head legs of a hospital bed to position that bed in a desired location with respect to the module. The invention contemplates using the so-called electronic bedside cabinet in connection with the bed and the communication cable, telephone connection and power to the bedside cabinet are extended from the module to the cabinet. In certain instances, in intensive care rooms, bedside cabinets will not be used and all of the lights in the module will be controlled by switches located in the module.

In the preferred form, examining lights are mounted near the top of the inside panel of each side section of the module and switches for controlling these examining lights are located at the front edge of each side section. Also located in these side sections are observation lamps located in approximate alignment with the top edge of the mattress of the bed when that bed is in its normal low position. Switches for controlling the observation lights are also located on the front edges of the side sections of the module. Also located on the front edges of the side sections are several electrical receptacles, each protected by a circuit breaker. Also located on these edges are grounding bars which provide a convenient way to ground a piece of hospital equipment, such as an electrocardiograph, which requires a ground connection.

Also located on the inner surfaces of the side sections are a pair of vertically disposed reading lamp means on each side section. These lamps are controlled by the patient through switches located in the bedside cabinet. In instances where no bedside cabinet is used, these lamps will be controlled from switches in the module. Also located in each side section is a ceiling lamp which is also controlled by a switch on the bedside cabinet.

Positioned at the bottom of each side section of the module is a small wattage night lamp which burns continuously enabling a night nurse to observe the location of the bed when making her rounds. Should further observation of the patient be required, the nurse can turn on the observation lights from either side of the bed, and since these lights are located low with respect to the patient, a minimum disturbance of the patient results.

The lighting arrangement of the core module provides a distinct improvement over the prior art of which we are aware. The vertically disposed reading lamp means provide an ample glare-free light for reading. The examining light arrangement provides adequate light for examination of a patient without the use of auxiliary lighting.

BRIEF DESCRIPTION OF THE DRAWINGS

FIG. 3 is a top plan view of the framework of the module;

FIG. 4 is a front elevational view of the framework;

FIG. 5 is an elevational view of the inner face of a side section of the framework with lighting equipment installed therein;

FIG. 6 is an elevational view of the outer face of a side section framework with gas equipment installed therein;

FIG. 7 is an elevational view of the outside face of a panel for the framework shown in FIG. 5 with an installed light fixture installed thereon;

FIG. 8 is an elevational, somewhat diagrammatic, view of a side section framework drawn to an enlarged scale with parts broken away and showing the communication cable junction bars, the electrical junction box and certain lighting units installed therein;

FIG. 11 is an elevational view of an examining light unit drawn to an enlarged scale;

FIG. 12 is an elevational view of the unit partially in section;

FIG. 13 is a cross-sectional view of the unit taken along the line 13—13 of FIG. 12 looking in the direction of the arrows;

FIG. 14 is a cross-sectional view of the unit taken along the line 14—14 of FIG. 15 looking in the direction of the arrows;

FIG. 15 is a cross-sectional view along the line 15—15 of FIG. 12 looking in the direction of the arrows;

FIG. 16 is a perspective view of a wall mounting frame and ceiling boot;

FIG. 17 is a perspective view of the leveling wedge and mounting bracket;

FIG. 18 is a cross-sectional view taken substantially along the line 5—5 of FIG. 4 and showing the mounting bracket registered with the mounting frame and the leveling wedge registered with the mounting bracket; and FIG. 19 is a schematic wiring diagram of the module.

DESCRIPTION OF THE PREFERRED EMBODIMENT

Figure 1:
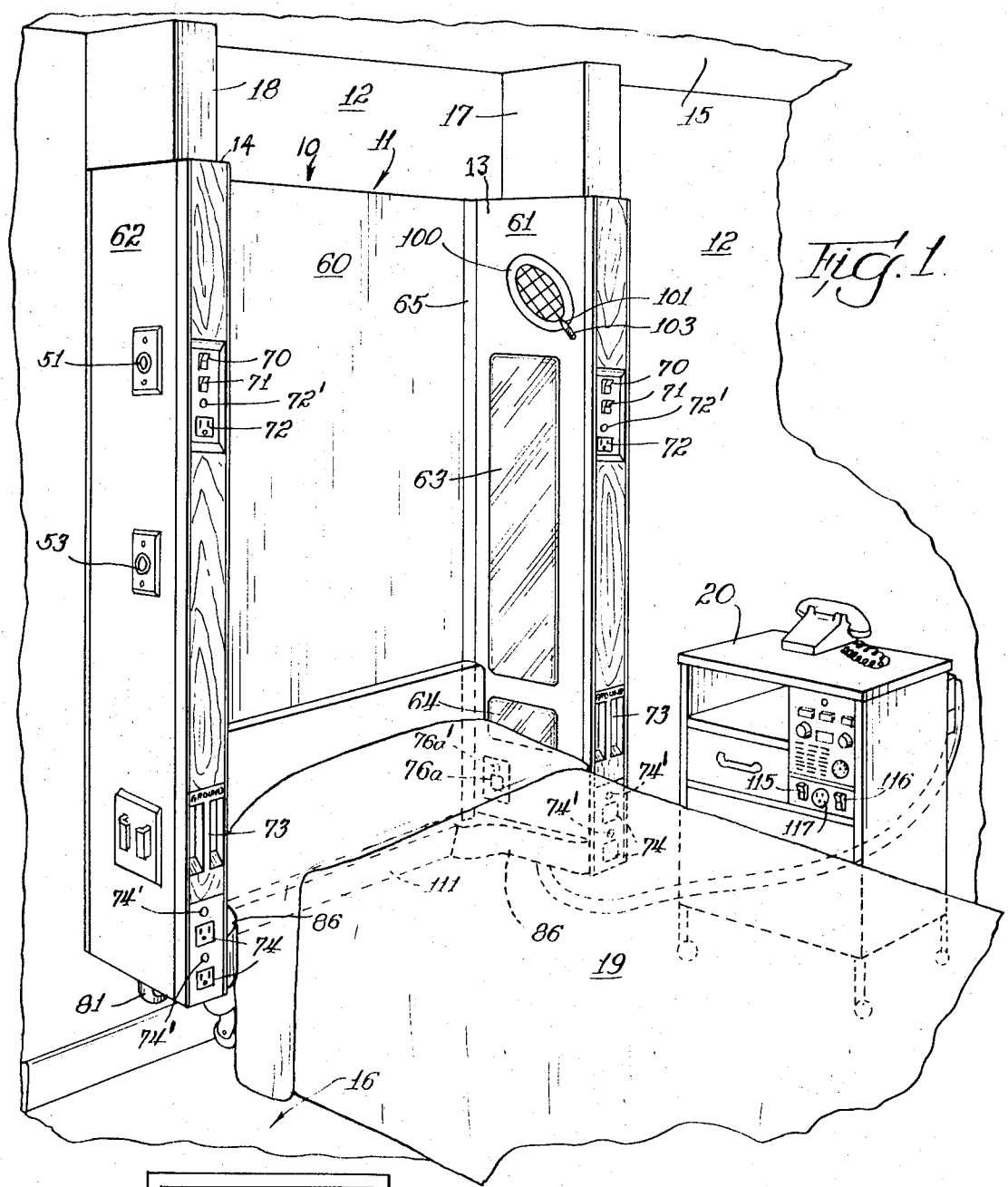
FIG. 1 is a perspective view of the core module mounted upon the headwall of a hospital room, with a hospital bed registered therewith and an electronic bedside cabinet connected thereto.

Referring now to the drawings in more detail, in FIG. 1 will be seen that the core module indicated generally at 10 has a wall section indicated generally at 11 adjacent the wall 12 of the room. Extending forwardly from the wall section 11 are side sections 13 and 14. It will be noted that the top of the module 10 is beneath the ceiling 15 of the room and the bottom of the module is spaced above the floor 16 thereof a distance sufficient to permit operation of the floor cleaning equipment without interference from the module.

A service cover 17 extends upwardly from the top edge of the section 13 and through the ceiling as does the service cover 18 extend from the side section 14. The bed 19 is positioned with respect to the module and the electronic bedside cabinet 20 in the example shown is positioned on the left side of a patient in the bed.

As will be seen best in FIGS. 3, 4 and 10, the framework of the module contains vertically disposed rectangular tubes 25 and 26 which extend from the bottom to points well above the top of the module, but below the ceiling of a room in which the module is mounted. A top horizontal bar 27 seen in cross-section in FIGS. 5 and 18 extends between the tubes 25 and 26 and is attached thereto. Disposed below bar 27 is a cross-channel 28 positioned with its web on the back or wall-engaging face of the module. Below the channel 28 are cross tubes 29 and 30 which, in the embodiment shown, are rectangular tubes best seen in FIG. 5. Attached to the lower tube 30 is a lower plate 31 which contains a plurality of elongated perforations for a purpose hereinafter described.

Fixed to the wall tubes 25 and 26 and to the cross-member 27 are wedge shaped upper plates 33 which, from FIG. 3, it will be seen are formed as rights and lefts. Each plate 33 has depending from it a flange 34.

Figures 9, 10:
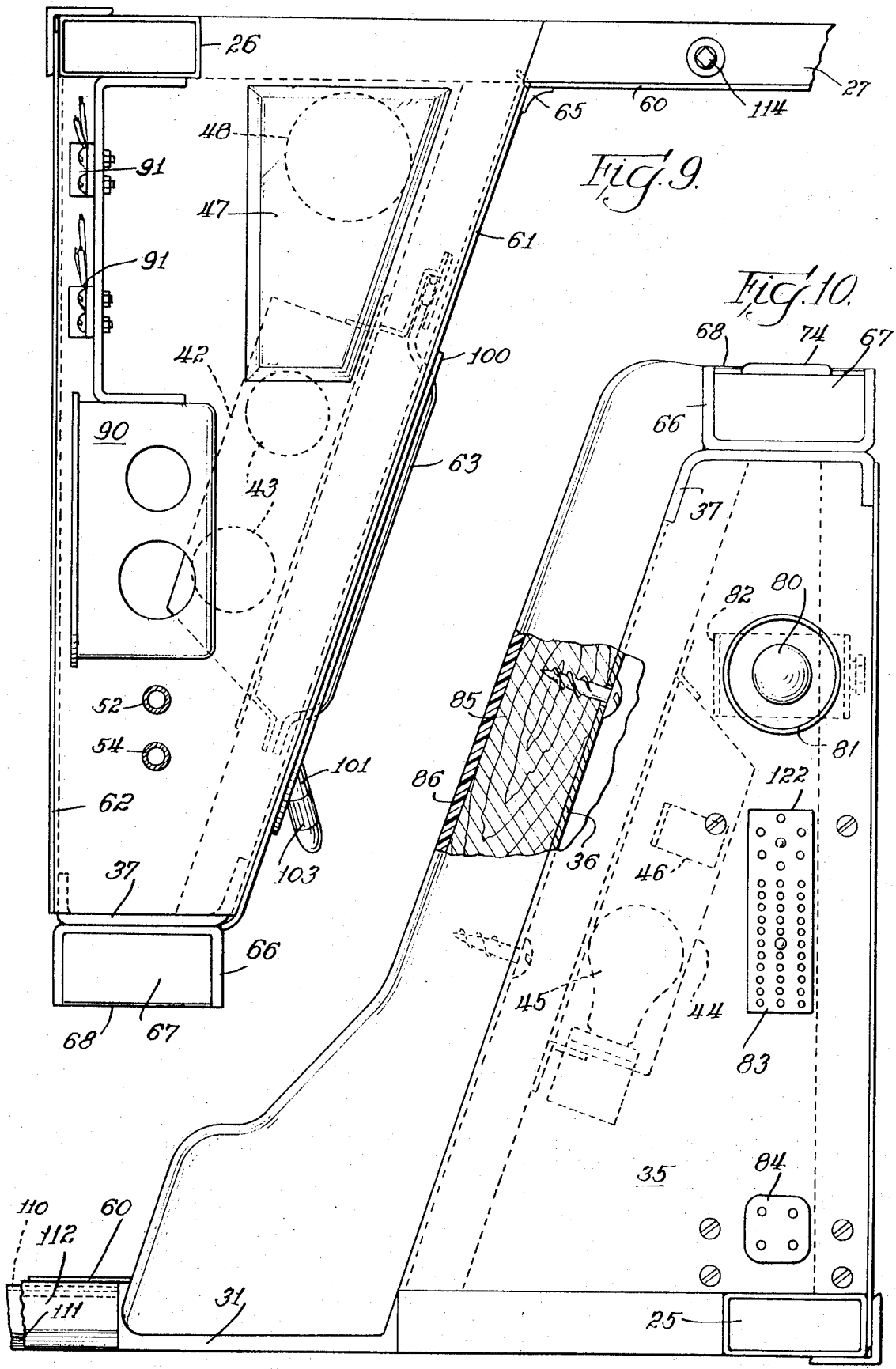
FIG. 9 is a topside plan view of a side section of the module
FIG. 10 is a bottom side view of a side section of the module.

Fixed to the lower ends of tubes 25 and 26 and to the lower cross-tube 30 are bottom plates 35 best seen in FIG. 10, which have upwardly extending flanges 36 best seen in FIGS. 4 and 5. Fixed between the upper and lower plates is a front frame channel 37 which contains rectangular openings 38 for a purpose later explained. Fixed to and extending between the horizontal members of the framework are vertical members 31, one of which may be a plate to which ballasts 39 are attached.

As will be seen best in FIG. 5, the inner face of each of the side sections 13 and 14 of the module frame contain horizontal angle members 40 and vertical members 41, which, between them, support an elongated lamp box 42 in which are mounted two reading lamp means 43.

Also, the frame members support a smaller lamp box 44 in which an observation lamp 45 is positioned. This lamp is a small wattage lamp, and to guard against the possibility of a larger lamp being inserted, a stop 46 is mounted in the lamp box 44. A ceiling lamp box 47 is mounted in the framework adjacent the upper plate 33 thereof.

As will be seen in FIG. 6, the other face of each side section of the module contains horizontally disposed members, preferably angles, between which vertical angles 50 are fixed. Fixed to angles 50 are an oxygen valve 51 and a suction valve 53 to which supply tubes 52 and 54 are connected, respectively.

As will be seen best in FIGS. 1, 9 and 10, the framework is covered by backwall panel 60 and each side section of the module is covered by an inner face panel 61 and the outer surfaces by an outer face panel 62. Panels 61 carry lamps lenses 63 which may be composed of glass or plastic, as desired, and also lamp lenses 64 that cover the observation lamps.

A cove molding 65 is installed at the junction of panels 60 and 61 to give a pleasing appearance to the module.

The framework of the module is composed of metal, preferably steel, and the cover panels 60, 61 and 62 are also composed of steel, the exposed surfaces of which are painted with a color that is the same as, or one that harmonizes with, the color of the walls of the room. If desired, panels 60, 61 and 62 may be covered with a suitable covering material, such as vinyl, which may be of any desired color and may be either plain or patterned, as desired. The resulting structure renders the side sections of the module completely encased and electrical wiring contained therein is protected sufficiently to render conduits and the like unnecessary. Wiring extending from one side of the module to the other can be extended through cross-channel 28 which protects it.

Attached to the front frame channels 37 are trim channels 66 which carry wooden inserts 67 that are faced with veneers 68 which are colored and grained to harmonize with the coloring and grain of the head of the bed and the bedside cabinet.

Mounted in each trim channel 66 is an upper switch 70, a lower switch 71 and an outlet socket 72. Also mounted in the trim channel is a ground bar 73 and a pair of sockets 74. Also mounted in each bottom plate flange 36 is a bed outlet socket 76.

As will be seen best in FIGS. 6, 8 and 10, projecting through an opening in the bottom plate 35 is a night lamp 80, the housing 81 of which is supported in a slotted bracket 82. This permits the lamp to be moved upwardly into the module thereby to prevent damage to the lamp during transportation and installation of the module. In certain instances, a night lamp may not be wanted by a hospital and the housing 81 can be pushed up into the module and retained therein.

Also mounted in plate 35 is a communications receptacle 83 which is a multi-point receptacle and serves to extend the communications cable to the bedside cabinet and also to extend electric power to the bedside cabinet. Also mounted in the bottom plate 35 is a telephone receptacle 84. As indicated in FIG. 6, to guard against the possibility of interference between the electrical equipment and the telephone line, the leads to the telephone receptacle 84 can be extended through a vertical tube 25 or 26.

As will be seen best in FIG. 10, secured to the flange 36 of the bottom plate 35 is a member 85 shaped to position the head end of a bed in a desired location with respect to the module. Preferably member 85 is composed of wood, although the use of other materials is contemplated. The member 85 is faced with a facing 86 which may be rubber or a resilient plastic, as desired.

As will be seen in FIGS. 8 and 9, an electrical junction box 90, communication terminal blocks 91 and gas tubes 52 and 54 are all located in one side section of the module. This arrangement is for illustration only. With the bedside cabinet on the left side of the bed as shown in FIG. 1, the box 90 and the blocks 91 would be located on top of side section 13 of the module and the gas tubes 52 and 54 would be located on top of side section 14. The conductors of the communication cable 92 are fanned out on the blocks 91 and on the receptacle 83. Communication cable 92 is extended from the blocks 91 into the adjacent vertical tube 25 or 26 thence out of the tube to the receptacle 83. A box 94 covers the cable 92 and that part of the receptacle to which the cable conductors are connected to eliminate the possibility of interference between the 120-volt leads and the communication circuits. The electrical wiring is extended from the various switches, etc., and the junction box 90 in the manner best seen in the circuit diagram in FIG. 19.

In certain instances, a 240-volt circuit may be required. FIGS. 6 and 8 show an outlet box 55 in which a 240 receptacle may be mounted.

As will be seen in FIG. 1, an examining light is located near the top of the inner surface wall 61 of the side section 13 of the module. A similar light is located on the corresponding surface of side section 14. As will be seen in FIGS. 7 and 11 through 15, the louver housing 95 is supported on the outer surface of the side panel 61 by a generally A shaped bracket 96 by a pivot pin 97 which permits limited rotation of the housing around the axis of the pin.

An examining lamp 98, preferably a spotlight of about 75 watts power, is mounted in the distal end of the bracket 96. A louver 99 is fixed in the housing to direct the light beam. A face plate 100 fixed to the housing and located on the side of panel 61 opposite bracket 96, contains a grid which aids in directing the light beam.

Fixed upon plate 100 is a boss 101 in which a notched lock pin 102 is journaled. A lock cap 103 is threaded upon pin 102. Unscrewing the cap loosens the pin and permits movement of the housing and louver to direct the light beam to a desired spot. The lock pin is then tightened to secure the beam at that spot.

Figure 2:
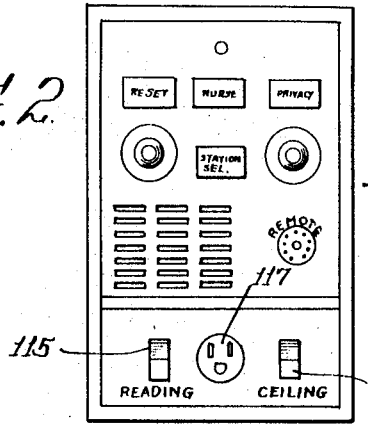
FIG. 2 is a front elevational view of the electronic section of a bedside cabinet.

Switches 70 and 71 are not available to a patient in the bed. In FIG. 1, we have shown a bedside cabinet 20 as an example of one of the many cabinets that can be used with the module. The details of the cabinet are not of the essence of the present invention. As will be seen in FIG. 2, the cabinet contains a switch 115 by which reading lamps 43 are controlled. Switch 115 is a three-position switch. In the center position, lamps 43 on both sides of the module are extinguished. In one end position, one lamp 43 on each side of the module is operated. In the other end position, both lamps 43 on both sides of the module are operated.

The cabinet also contains a switch 116 by which the ceiling lights 48 are operated, and an outlet 117 which renders commercial current available to a patient.

The wiring diagram of the core module shown in the drawings is shown in FIG. 19. As shown, the junction box 90 is equipped with an insulating block 120 that carries 11 pairs of terminals. Power is supplied to the module by the three wire lead system now commonly used. The ground of the power supply is connected to grounding terminal 121 to apply ground to the framework of the core module.

The power conductor of the power supply, not shown, will be connected to righthand terminal 1 to supply power to the lamp switches 70 and 71 and night lamp 80 of the module through wires connected to the lefthand terminal of pair 1 on the block 120. The neutral conductor of the power supply will be connected to terminal 2 and wires leading to the lamps in the module are connected to the lefthand terminal of pair 2.

The power supply will also be connected to the right terminal of pair 3 and wires connected to the left terminal of pair 3 will supply power to the receptacles 72, 74 and one of the receptacles 76. Neutral will be connected to right terminal 4 and wires connected to the left terminal of pair 4 will extend neutral to these terminals.

Power and neutral will be connected to right terminals 5 and 6, respectively, and wires extending from the left terminals of this pair will extend to receptacle 122 through which the bedside cabinet will be connected by a plug 122'. For clarity herein, receptacle 122 is shown as a separate unit although, as explained heretofor, the six wires leading to the receptacle will be connected to points in receptacle 83 as shown at 93 in FIG. 8, and conductors connected to plug 122' will be included in the plug connected to receptacle 83.

Most hospitals provide an emergency power supply which is used when the normal power supply fails. Emergency power and neutral, when provided, will be connected to right contacts 7 and 8, respectively, and wires connected to the left contacts of these pairs will extend to the receptacle 76a to which the hospital bed can be connected if needed. This arrangement permits operating the bed even though the main power supply has failed.

In certain instances, 240-volt supply may be required. 240-volt leads are connected to the right terminals 9, 10 and 11, and wires to 240-volt receptacle 123 connected to the left terminal. Receptacle 123 will be located in a special box such as box 55 shown in FIGS. 6 and 8.

From FIG. 19 it will be seen that the ceiling lights 48 are 75-watt bulbs which are controlled by switch 116 in the bedside cabinet. The examining lights 98 are 75-watt spotlight type bulbs controlled by the upper switches 70 on the side sections of the core module. Switches 70 are three pole single throw switches connected in multiple so that operation of either of the two switches 70 will operate both of the examining lights. In addition to lighting lamps 98, switches 70 operate both reading lamps 43 in both side sections and also operate the ceiling lamp 48 in both side sections. Through this arrangement, adequate light is provided and examination of a patient can be accomplished without the use of an auxiliary examining light. Since switches 70 are connected in multiple, the switch used to turn on the examining lights must be used to turn them off.

The observation lights 45 are shown to be 15 watt lamps and are controlled by the lighted switches 71 upon the core module. Switches 71 are single pole double throw switches arranged so that the operation of either one of them will operate both of the observation lights.

The night light 80, preferably a 7 ½-watt lamp, is lighted continuously to throw a small light upon the floor of the room alongside of the bed.

Two balasts 39 are provided and circuit to both of these balasts controlled by switch 115 upon the bedside cabinet. Switch 115 is a three-position double pole switch having a neutral position in which the circuit through the switch is open. When the switch 115 is closed to its upper position, the balast connected only to the rear one of the fluorscent lamps on each side is energized, illuminating only those lamps. When the switch 115 is thrown to its lower position, all lamps on each side are energized.

As shown in the drawings, lamps 43 are fluorescent lamps and while this type of lamp is advantageous in that it provides a soft light of intensity sufficient for the purpose intended, the use of other types of lamps is contemplated. In certain instances, it may be advantageous to use tubular incandescent lamps or a string of vertically aligned incandescent lamps uniformly spaced apart. With incandescent lamps, balasts 39 will not be needed.

Each of the receptacles 72 on the side sections of the core module are protected by the circuit breaking means 72', the reset button of which is available immediately above the socket. Each receptacle 72 is a three-wire receptacle and the ground is connected to the frame of the module. The two receptacles 76 and 76a by which the power may be supplied to the hospital bed, are each protected by a circuit breaking means 76' and 76a', the reset button of which is located just above the receptacle. The ground connection of these receptacles are likewise connected to the frame of the module.

The upper receptacle 74 on each side of the side sections of the module are each protected by circuit breakers 74', the reset button of which is available immediately above the receptacle. The ground connection of each of the receptacles is connected to the frame of the module. The lower receptacle 74 on each side of the side section of the module are also protected by a circuit breaker 74', the reset buttons of which are located immediately above the receptacle. The ground connection of each receptacle is connected to the frame of the module.

In one instance, the circuit breakers 72' and 74' are arranged to open the circuit to the socket when the current therethrough exceeds 15 amperes.

In the drawings, circuit breakers 72' and 74' are shown. In certain instances, these devices may be replaced by cartridge type fuses, if desired.

In October, 1962, the United States Department of Health, Education and Welfare, published a bulletin directed to lighting of hospital patient rooms. This publication was No. 930–D–3. With the wattage of the various lamps as above specified, the conditions specified in this bulletin are met or exceeded in every instance. The use of vertically disposed lamps provides a reading lamp intensity superior to any heretofor used, even when the head section of the bed is elevated and the patient is in a sitting position.

As will be seen in FIG. 16, a mounting frame is used to mount the module upon the headwall of a patient's room. This frame consists of a horizontal channel 106, the web 107 of which is secured to the studding in convenient manner, as by welding. Bolts 108 are projected through the web and secured thereon by welding. Vertical channels 104 extend upwardly from the ends of channel 108 and the webs of these channels contain a plurality of uniformly spaced apart bolt holes. A ceiling boot 105 is secured to each channel 104 by a bolt extending through one of the bolt holes in channel 104. Since the module 10 is to be mounted a predetermined distance above the floor 16 of the room, the top of the module will be a fixed distance above that floor. Ceiling heights in hospital rooms vary over a wide range. The bolt holes in channels 104 permit locating the ceiling boots 105 at the proper place for a particular ceiling.

As will be seen in FIGS. 4 and 17, the top horizontal bar 27 of the module framework is a rectangular tube. The upper wall of tube 27 contains a pair of holes through each of which the shank of a collared screw 114 is projected with the collar 114' of that screw engaging the inner face of that wall. A washer surrounds the shank of screw 114 and a pin is projected through the shank to hold the screw in the bar. A leveling wedge 113 is threaded upon each screw 114. The bottom and side walls of the bar 27 are cut away to permit placing the wedge within the bar.

As will be seen best in FIG. 18, each bracket 109 is secured to channel 106 by bolt 108. When the module is hung on the wall brackets 109 extend through the cut away portions of bar 27 into engagement with leveling wedges 113. Channels 106 are supposed to be horizontal. The shanks of screws 114 are shaped to receive a wrench by which the screws can be turned to raise or lower the wedges 118 as required to level the module.

As will be seen in FIGS. 4 and 8, the bottom plate 31 contains perforations shown to be three in number through which screws are extended to fix the bottom of the module with respect to the headwall. As will be seen in FIG. 8, the plate 31 has an upwardly extending flange 110 portion spaced a slight distance from vertical member of the framework. The plate also has a flare 111 at its lowest edge. After the screws have been inserted through the plate, a cover plate 112 is hooked over the flange 110 and at its lower ends snapped over the flare 111 to complete the mounting of the module upon the wall. The cover plate 112 is the only part of the core module that is added to the module at the point of mounting of the same.

From the foregoing it will apparent that the core module of the present invention possesses many advantages. Since the module is completely fabricated, equipped, wired, tested and enclosed at the factory for shipment to a hospital as a unitary structure to be mounted upon the headwall of a patient's room, the cost of constructing the headwall is greatly reduced since it is an ordinary wall, except for the addition of a mounting plate or channel for each bed to be installed against the wall. The core modules are equipped with eight outlets so that ample outlets are available for connecting up whatever electrical equipment that is to be used with the bed. Each outlet is protected by a circuit breaker so the danger of overloading the circuit is eliminated. Each side of the module is equipped with a grounding bar to which grounds required by equipment used in connection with the treatment of the patient can be connected in a convenient manner.

The provision of vertically disposed lamp means positioned outwardly from the headwall of the room and having reflectors directing the light across the bed from each side thereof is advantageous. A patient in the bed holding reading material in a normal reading position will find that material adequately lighted and free from shadows. A patient sitting in an upright position in a retractable bed will find this lighting an improvement over lighting available heretofor.

While we have chosen to illustrate and describe our invention in connection with a particular embodiment thereof, this has been done by way of example only as there are many modifications and adaptions which can be made by one skilled in the art within the teachings of the invention. As shown, the module is equipped to have the bedside cabinet upon the lefthand side of a patient in the bed. In a semi-private or two-bed ward, one bed will be equipped in this manner and the other bed preferably equipped so that the bedside cabinet is located at the righthand side of a patient in the bed. These and other modifications are contemplated.

Having thus complied with the statutes and shown and described a preferred embodiment of the invention, what we consider new and desirable to have protected by letters patent is pointed out in the appended claims.

What is claimed is:

1. A factory assembled, equipped, wired, tested and enclosed core module that can be shipped and installed and to which electric communication and gas services can be connected without opening the module, which module comprises:
  a. a rectangular central section
  b. a wedge shaped side section on each vertical edge of said central section;
  c. bed locating means at the lower end of each side section;
  d. a service cover extending upwardly from the top of each side section;
  e. electrical equipment located in each side section;
  f. gas equipment mounted in at least one of said side sections; and
  g. means for hanging said module upon the headwall of a hospital room.

2. A core module as specified in claim 1 in which the central section consists of a metallic framework having vertical and horizontal members and a cover panel fixed on said framework.

3. A core module as specified in claim 1 in which each side section consists of a metallic framework having vertical and horizontal members which support said equipment and inner and outer cover panels enclosing the sections.

4. A core module as specified in claim 1 in which the bed locating means consists of a member fixed on the inner face of each side section and extending inwardly therefrom and shaped to engage the head end of a bed, which member is faced with a resilient bed engaging facing.

5. A core module as specified in claim 1 in which the service covers are hollow rectangular members fixed to vertical side members of the central section and are long enough to extend from the module through the ceiling of the room.

6. A core module as specified in claim 1 in which an electrical junction box fixed on top of at least one said side section contains an insulating terminal block containing a plurality of pairs of contacts to one contact of each pair a power input conductor is connected and to the other contact of each pair a wire leading to the electrical equipment is connected.

7. A core module as specified in claim 1 in which an observation light is mounted on the inner side of each side section at approximately the height of a bed and a switch is mounted on the front edge of each side section, operation of either switch operating both of said observation lights.

8. A core module as specified in claim 1 in which a constantly burning low wattage night lamp extends below the bottom of each side section.

9. A core module as specified in claim 1 in which communication terminal blocks are fixed on top of at least one of said side sections, a communication cable is extended from said blocks to multi-point receptacle at the bottom of that section to enable communication circuits to be extended to a bedside cabinet having a cable connection to said receptacle.

10. A core module as specified in claim 9 in which conductors extend from an electrical junction on top of said module to contacts in the multi-point receptacle to extend electric power to said bedside cabinet.

11. A core module as specified in claim 10 in which a ceiling lamp is located at the top of each side section and a switch in the bedside cabinet operates both of said lights.

12. A core module as specified in claim 10 in which a pair of vertical reading lamp means are mounted in each side section and in which a switch in the bedside cabinet controls the lamps in both sections.

13. A core module as specified in claim 12 in which the bedside cabinet switch is a double pole double throw switch having a central position in which all lamps are out, one end position in which one lamp means in each side section is lighted and an opposite end position in which both lamp means in both side sections are lighted.

14. A core module as specified in claim 1 in which the electrical equipment includes an examining lamp located on the inner side of each side section near the top thereof and a switch on the front edge of each side section, operation of either of said switches operating both of said examining lamps.

15. A core module as specified in claim 14 in which operation of either switch operates both reading lamps in both side sections and both ceiling lamps in addition to operating both examining lamps.

16. A core module as specified in claim 1 in which the electrical equipment includes a metallic grounding bar mounted upon the front edge of each side section and connected to the grounded framework of the module.

17. A core module as specified in claim 1 in which a plurality of outlet receptacles are mounted in each side section and in which each receptacle is protected by a circuit breaking means located immediately above the receptacle.

18. A core module as specified in claim 1 in which the gas equipment includes at least one oxygen valve and at least one vacuum valve and supply tubes extending from those valves into the service covers on that side section.

19. A core module as specified in claim 1 in which the means for hanging the module includes a horizontal bar at the top of the central section of the module, a pair of leveling wedges threaded upon screws journalled in said bar and engageable each with a mounting bracket fixed upon the headwall which wedges are movable to level the module upon the wall.

20. A core module as specified in claim 19 in which both mounting brackets are secured to a horizontal channel in a mounting frame and project through slots in the horizontal bar to engage the leveling wedges.

21. A core module as specified in claim 1 in which the mounting means includes a slotted plate at the bottom of the central section through the slots in which screws are extended to secure the bottom of the module to the headwall and in which a cover attached to said plate conceals the slots and screws.

* * * * *